United States Patent [19]

Bertelli et al.

[11] 3,861,438

[45] Jan. 21, 1975

[54] PNEUMATIC TIRE FOR VEHICLE WHEELS

[75] Inventors: Italo Bertelli; Giorgio Tangorra, both of Milan, Italy

[73] Assignee: Industrie Pirelli S.p.A., Milan, Italy

[22] Filed: Mar. 26, 1973

[21] Appl. No.: 345,070

[30] Foreign Application Priority Data

Mar. 28, 1972 Italy .................................. 22465/72

[52] U.S. Cl. ........ 152/353 C, 152/330 RF, 152/355, 152/374
[51] Int. Cl. .......................... B60c 13/00, B60c 9/02
[58] Field of Search ........................... 152/352–357, 152/361 R, 374, 330 R, 158

[56] References Cited
UNITED STATES PATENTS

| | | | |
|---|---|---|---|
| 595,422 | 12/1897 | Van Zandt | 152/353 |
| 597,569 | 1/1898 | Van Zandt | 152/209 R |
| 1,337,660 | 4/1920 | Killen | 152/353 |
| 1,462,984 | 7/1923 | Schenuit | 152/352 |
| 2,146,942 | 2/1939 | Czerwin | 152/353 |
| 3,421,566 | 1/1969 | Sidles et al | 152/352 |
| 3,540,510 | 11/1970 | Smithkey, Jr. | 152/353 |

FOREIGN PATENTS OR APPLICATIONS 313,649  6/1929  Great Britain ..................... 152/353

*Primary Examiner*—Drayton E. Hoffman
*Attorney, Agent, or Firm*—Clelle W. Upchurch

[57] ABSTRACT

A pneumatic tire for vehicle wheels which includes a tread, an annular reinforcing structure, two sidewalls, two beads and having a plurality of slits in the inner and outer surfaces of the sidewalls which may come into contact with other surfaces of the tire or wheel in consequence of the deflation of the tire. The slits are prevailingly oriented in a direction perpendicular to the direction in which takes place the relative slidings between the contact surfaces. Each sidewall has a cross-section along meridian planes of such a shape that its section midline in the meridian plane has a convexity directed towards the tire inside and a flexional rigidity in the meridian plane such that the convexity does not change in direction even under normal operating inflation pressure. The flexional rigidity has a value which is smaller than that of the analogous rigidity of the remaining portions of the sidewall.

4 Claims, 3 Drawing Figures

PATENTED JAN 21 1975 3,861,438

PNEUMATIC TIRE FOR VEHICLE WHEELS

The present invention relates to pneumatic tires for vehicle wheels and, more precisely, the sidewalls of the tires.

In copending U.S. Pat. application Ser. No. 273,337 there is described a pneumatic tire comprising a tread, two sidewalls and two beads. Each of the two sidewalls has a cross-section of such a shape that its section midline in the meridian plane has a convexity, directed towards the tire inside, which does not change in direction even under the action of the normal inflation pressure. Each of the sidewalls comprise moreover at least a portion having a flexional rigidity in the meridian plane whose value is smaller than that of the analogous rigidity of the remaining portions of said sidewall, and the tread of said tire is provided with an annular reinforcing structure, which is flexible but is substantially inextensible both in the direction of the parallels and in the direction of the meridians.

As described in the copending U.S. application Ser. No. 273,337, the sidewalls of the tire work chiefly under compression and therefore they do not require continuous reinforcing structures; consequently, they can be made in the desired thickness, by means of a simple process of pouring or molding of the compound.

Moreover, owing to their particular configuration, the sidewalls, in the event of a drop of pressure due to a possible puncture of the tire, do not collapse completely, but lean on the edge of the rim flange and are able to bear the load of the vehicle, even if at a reduced speed and for a relatively short run.

The present invention aims at providing further improvements which permit to obtain an improved performance of the tire under the above indicated conditions, namely in the absence of the inflation pressure.

Accordingly it is an object of the present invention to provide a pneumatic tire for vehicle wheels comprising a tread, two sidewalls and two beads, each sidewall having a cross-section, along meridian planes, of such a shape that its section midline, in the meridian plane, has a convexity directed towards the tire inside, the said sidewall having moreover such a flexional rigidity, in the meridian plane, that the convexity does not change in direction even under the action of the inflation pressure in normal operating conditions, the tire being provided in an already known way with an annular reinforcing structure which is flexible but is substantially inextensible both in the direction of the parallels and in the direction of the meridians, each sidewall comprising at least a portion having a flexional rigidity in the meridian plane whose value is smaller than that of the analogous rigidity of the remaining portions of said sidewall, with a plurality of slits in the inner and the outer surfaces of the sidewalls which may come into contact with other surfaces of the tire or of other elements of the wheel in consequence of the deflation of the tire, the slits being prevailingly oriented in a direction perpendicular to the direction in which take place the relative slidings between the contact surfaces.

The main advantage which is obtained by means of the plurality of slits provided on the surfaces of the sidewalls is that of permitting pre-established deformations of said surfaces when they come into contact with other inner surfaces of the tire or of other elements of the wheel (as for instance the rim flanges) in consequence of the collapse of the tire due to insufficient inner pressure.

By permitting the deformations, it is possible to avoid the occurrence of relative movement or sliding, chiefly due to the different rolling radii of the different elements of the wheel (tread, sidewalls, rim flanges), which, originating the abrasion and the over-heating of said surfaces in contact, would give rise to a premature deterioration of the whole tire.

This is probably due to the fact that, by means of the slits, the surface cutting resistance of the compound constituting the sidewalls is reduced, so that the friction exerted between the two surfaces in contact originates an elastic deformation of the surface provided with the slits, preventing therefore the relative sliding between the two surfaces.

In order that in certain areas of the surfaces in contact the above indicated slidings may take place along a plurality of directions, in a preferred embodiment of the invention the slits define a series of blocks.

According to a further preferred embodiment, the slits have a constant depth ranging between 0.3 mm and 20 mm and the distance between the axes of two adjacent slits, parallel to each other, ranges between 0.3 and 2.5 times the depth. In this way the zones comprised between the slits are able to withstand the load of the vehicle, when the inflation pressure is lacking, without in any way suffering a substantial deformation due to buckling.

Preferably, the ratio between the total volume of the slits and the total volume of the zones comprised between the slits ranges between 0.02 and 1.

The invention will now be better illustrated with reference to the attached drawings, made by way of non-limiting example, in which.

Figure 1:
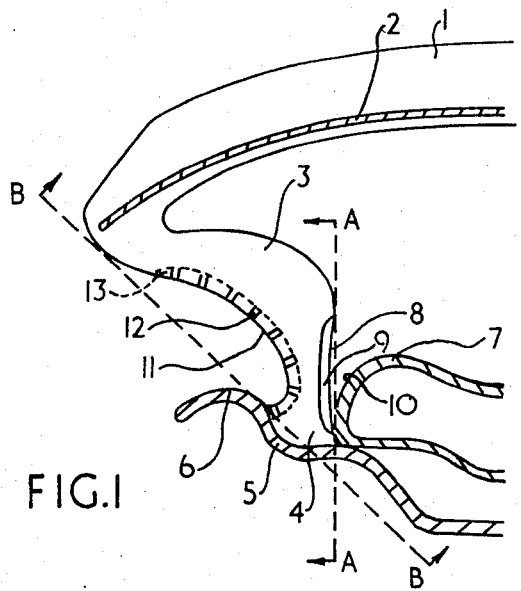
FIG. 1 represents one half of the cross or meridian section of a deflated, but not squeezed tire in accordance with the present invention.

FIG. 1 represents one half of the cross-section of a tire in deflated condition, but not squeezed under load (the other half being symmetrical to that illustrated), which comprises a tread 1, an annular reinforcing structure 2, a sidewall 3 and a bead 4.

The tire is mounted on a rim 5 having a flange 6, and a spacing element 7 is interposed between the two beads in order to keep them fixed in their seat.

The inner radially lower portion 8 of the sidewall 3 is provided with a plurality of slits 9, parallel to one another and parallel to the meridian planes of the tire.

Figure 2:
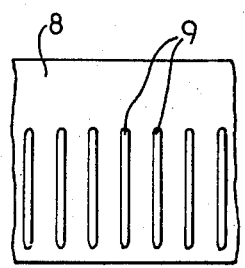
FIG. 2 represents diagrammatically a partial view taken along plane AA of FIG. 1.

Said plurality of slits appears also in FIG. 2, which represents a partial view taken along plane AA of FIG. 1.

The series of slits extends obviously along the whole circumferential development of said sidewall zone.

The slits 9 have a width of 0.5 mm, a constant depth of 3 mm and are spaced apart from one another by 2.5 times said depth; the ratio between the total volume of said slits 9 and the total volume of the zone comprised between said slits is 0.066.

The arrangement of the slits 9 along the direction parallel to the meridian plane is clearly directed to counteract the slidings in the circumferential direction between the inner lower surface 8 of sidewall 3 and the outer surface 10 of the spacing element 7 which may come into contact with each other in the event of tire deflation.

Figure 3:
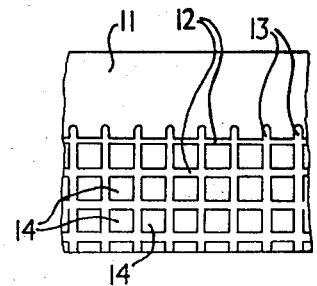
FIG. 3 represents diagrammatically a partial view taken along plane BB of FIG. 1.

The outer portion 11 of sidewall 3 is provided with a plurality of slits 12 oriented in a direction parallel to the direction of the circumferential planes of the tire and with a plurality of slits 13 (visible in FIG. 3) having a width of 0.7 mm and oriented in a direction parallel to the direction of the meridian planes of the tire itself. The intersections of slits 12 and 13 define a series of blocks 14.

The slits 12 and 13 have a constant depth of 3 mm and are spaced apart from one another by 2.5 times said depth; the ratio between the total volume of the slits 12 and 13 and the total volume of the zones comprised between the slits, namely the volume of the blocks, is 0.17.

The arrangement of the slits, oriented both along a direction parallel to the meridian plane and along a direction parallel to the circumferential plane of the tire, is intended to impart to the outer surface 11 of sidewall 3 a better possibility of local cutting deformation (with respect to that of zone 8) in order to better counteract the circumferential/transversal slidings between the outer surface 11 of sidewall 3 and the outer surface of the flange 6 of rim 5.

The above described example refers in particular to the surfaces of the sidewall which may come into contact with the rim or with the spacing element, but it is evident that the same measures can be taken for any zone of the sidewall which may come into contact with the inner surfaces of the tire.

It is therefore understood that the above described examples have no limiting character and that the scope of protection of the present invention includes any other alternative embodiment deriving from the above indicated inventive principle.

What is claimed is:

1. A pneumatic tire for vehicle wheels comprising
   a reinforced tread having a given width and side edges and two sidewalls comprising elastomeric material, extending from said tread side edges and terminating in beads for a rigid wheel rim,
   wherein said given width of the tread is wider than any other part of the tire and is reinforced over substantially the whole of its width by an annular structure which is substantially inextensible under the tire inflation pressure in both its circumferential and lateral directions, said annular structure extending to at least the midline of said sidewalls and
   wherein said sidewalls have a cross-sectional shape whose midline over substantially the whole length between the side edges of the tread reinforcement and the bead, is convex with respect to the interior of the tire under the tire inflation pressure, each of said sidewalls having in combination a bending stiffness, curvature and thickness sufficient to constrain the sidewall between said side edges of the inextensible tread reinforcement and the bead seat on the wheel rim whereby on inflation of the tire and under service conditions the sidewalls are placed under compression stress, said sidewalls having at least one end zone with a bending stiffness lower than the stiffness of the remaining zone, further wherein each sidewall comprises a plurality of slits in the inner and the outer surfaces of the sidewalls which may come into contact with other surfaces of the tire or of other elements of the wheel in consequence of the deflation of the tire, said slits being prevailingly oriented in a direction perpendicular to the direction in which the relative slidings between said contact surfaces take place.

2. The tire of claim 1, wherein said slits cross with one another to define a plurality of blocks between them.

3. The tire of claim 2, in which said slits have a constant depth ranging between 0.3 and 20 mm and the distance between two adjacent and parallel slits is comprised between 0.3 and 2.5 times said depth.

4. The tire of claim 1, in which the ratio between the total volume of the slits and the total volume of the zones comprised between said slits ranges between 0.02 and 1.

* * * * *